(12) United States Patent
Mizuno

(10) Patent No.: US 9,184,587 B2
(45) Date of Patent: Nov. 10, 2015

(54) POWER SUPPLY SYSTEM AND POWER FEEDING DEVICE

(75) Inventor: Tomoyuki Mizuno, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/238,063

(22) PCT Filed: Oct. 27, 2011

(86) PCT No.: PCT/JP2011/074806
§ 371 (c)(1),
(2), (4) Date: Feb. 10, 2014

(87) PCT Pub. No.: WO2013/061442
PCT Pub. Date: May 2, 2013

(65) Prior Publication Data
US 2014/0225437 A1     Aug. 14, 2014

(51) Int. Cl.
| B60L 1/00 | (2006.01) |
| H02J 3/38 | (2006.01) |
| H02J 7/00 | (2006.01) |
| H02J 1/00 | (2006.01) |
| H02J 9/06 | (2006.01) |
| B60L 11/18 | (2006.01) |

(52) U.S. Cl.
CPC . *H02J 1/00* (2013.01); *B60L 1/006* (2013.01); *B60L 11/1809* (2013.01); *B60L 11/1842* (2013.01); *H02J 9/06* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01); *Y10T 307/344* (2015.04); *Y10T 307/625* (2015.04)

(58) Field of Classification Search
USPC .............................................. 307/9.1, 23, 64
See application file for complete search history.

(56) References Cited

U.S. PATENT DOCUMENTS

| 2008/0169651 A1 | 7/2008 | Oyobe et al. |
| 2009/0030712 A1 | 1/2009 | Bogolea et al. |
| 2010/0164287 A1 | 7/2010 | Komazawa et al. |

FOREIGN PATENT DOCUMENTS

| CN | 101069340 A | 11/2007 |
| EP | 1819033 A1 | 8/2007 |
| JP | H08-154349 A | 6/1996 |
| JP | A 2001-8380 | 1/2001 |
| JP | 2006-158084 A | 6/2006 |
| JP | A 2008-283741 | 11/2008 |
| JP | A 2010-154637 | 7/2010 |
| JP | A 2010-239850 | 10/2010 |

*Primary Examiner* — Rexford Barnie
*Assistant Examiner* — Dru Parries
(74) *Attorney, Agent, or Firm* — Oliff PLC

(57) ABSTRACT

A power feeding device receives power from a vehicle and feeds the received power to a load external to the vehicle. A communication unit communicates between the vehicle and the power feeding device. A power supply unit supplies the communication unit with power. When an external power supply has failed, the power feeding device supplies the power that is received from the vehicle to the power supply unit to activate the communication unit, and the power feeding device also transmits via the communication unit to an ECU a specification regarding power supplied from the external power supply to the load. While the ECU follows a predetermined specification to control the power feeding unit, once the specification regarding power supplied from the external power supply to the load has been received, the ECU follows the received specification, rather than the predetermined specification, to control the power feeding unit.

11 Claims, 5 Drawing Sheets

POWER SUPPLY SYSTEM AND POWER FEEDING DEVICE

TECHNICAL FIELD

The present invention relates to a power supply system and a power feeding device, and more specifically to supplying power from a vehicle to a load external to the vehicle.

BACKGROUND ART

Electric vehicles, hybrid vehicles, fuel cell powered vehicles and other similar vehicles configured to be capable of generating force via an electric motor to drive the vehicle have a power storage device mounted therein to store power to drive the electric motor. When such a vehicle is started, accelerated or the like, the power storage device supplies the motor with power to generate force to drive the vehicle, whereas when the vehicle travels downhill, is decelerated or the like, the motor's regenerative braking generates power which is in turn supplied to the power storage device.

For such a vehicle, there has been proposed a configuration electrically connectable to a commercial power grid or a similar power supply external to the vehicle (hereinafter also simply referred to as an "external power supply") to electrically charge the power storage device (hereinafter also simply referred to as external charging). For example, a so called plug-in hybrid vehicle is known that allows an electrical outlet provided in premises to be connected to the vehicle's charging port via a charging cable to allow the power storage device to be electrically charged from a power supply of an ordinary household. This can increase the hybrid vehicle's fuel consumption efficiency.

For such an externally chargeable vehicle, a concept has been discussed to consider the vehicle as a power supply source to supply power from the vehicle to a load external to the vehicle, as seen in the smart grid.

For example, Japanese Patent Laying-Open No. 2010-154637 (Patent Document 1) discloses a power supply system allowing a power supply equipped vehicle and premises to be connected via a power supply cable and thereby bidirectionally supply power therebetween. Patent Document 1 describes that the vehicle is provided with a controller to control supplying power. The vehicular controller communicates with that of the premises by superimposing data on a power line including the power supply cable. When the vehicle is connected to the premises via the power supply cable, the vehicular controller switches plug-out power supply which supplies power from a vehicular power supply to the premises and plug-in power supply which supplies power from a power supply for the premises to the vehicle, as based on a voltage of a commercial power supply in the premises transmitted from the controller of the premises, the vehicular power supply's state of charge, and the like.

CITATION LIST

Patent Documents

PTD 1: Japanese Patent Laying-Open No. 2010-154637
PTD 2: Japanese Patent Laying-Open No. 2001-008380

SUMMARY OF INVENTION

Technical Problem

A configuration allowing power to be supplied from a vehicle's power supply to premises, as described in Patent Document 1, may allow the vehicle to be used as a backup power supply for a commercial power supply to supply the premises with power when the commercial power supply has failed. In Patent Document 1, however, once the commercial power supply has failed, the premises' controller is deactivated (or shut down) and cannot transmit to the vehicular controller the voltage of the commercial power supply in the premises. In such a situation, the vehicular controller cannot obtain the state of the power supply for the premises and hence cannot determine a specification (or frequency and voltage) of power to be supplied to the premises from the vehicular power supply. As a result, the vehicle cannot convert the vehicular power supply's power to power suitable for driving household electrical appliance in the premises, and it is thus difficult to supply power from the vehicular power supply to the premises.

The present invention has been made to overcome such a disadvantage, and it contemplates a power supply system and power feeding device that allows a vehicle to supply power to a load external to the vehicle when external power supply has failed.

Solution to Problem

The present invention in one aspect provides a power supply system including: a vehicle; and a power feeding device for receiving power from the vehicle and feeding the received power to a load external to the vehicle. The load is configured to receive power supplied from an external power supply and be driven thereby and to also receive power from the vehicle and be driven thereby once the external power supply has failed. The power feeding device includes a communication unit for communication between the vehicle and the power feeding device, and a power supply unit that supplies the communication unit with power. The vehicle includes a power generation unit, a power feeding unit for receiving power from the power generation unit and supplying the received power to the power feeding device, and a control device that controls the power feeding unit to convert the power received from the power generation unit into power to drive the load when the external power supply has failed. When the external power supply has failed, the power feeding device supplies the power that is received from the vehicle to the power supply unit to activate the communication unit, and the power feeding device also transmits via the communication unit to the control device a specification regarding power supplied from the external power supply to the load. While the control device follows a predetermined specification to control the power feeding unit, once the specification regarding power supplied from the external power supply to the load has been received, the control device follows the specification regarding power supplied from the external power supply to the load, rather than the predetermined specification, to control the power feeding unit.

Preferably, the power feeding device further includes a switch unit configured to compare voltage on a power feeding line associated with the external power supply and voltage on a power feeding line associated with the vehicle and supply the voltage on the power feeding line that has voltage thereon to the power supply unit.

Preferably, the load is connected via a switch to the power feeding line associated with the vehicle. The power feeding device closes the switch after communication has been established between the vehicle and the power feeding device by the communication unit.

Preferably, the power generation unit includes a rechargeable power storage device. The vehicle is configured to be capable of electrically charging the power storage device with power received from the external power supply. The power feeding unit receives power discharged from the power storage device and converts the received power into power to drive the load.

Preferably, the vehicle further includes an internal combustion engine as a source of force to drive the vehicle. The power generation unit includes a rechargeable power storage device, and a power generator configured to use an output of the internal combustion engine to generate power. The vehicle is configured to be capable of electrically charging the power storage device with power received from the external power supply. The power feeding unit converts at least one of power discharged from the power storage device and power generated by the power generator into power to drive the load.

The present invention in another aspect provides a power feeding device for receiving power from a vehicle and feeding the received power to a load external to the vehicle, including: a communication unit for communication between the vehicle and the power feeding device; a power supply unit that supplies the communication unit with power; and a switch unit configured to compare voltage on a power feeding line associated with an external power supply and voltage on a power feeding line associated with the vehicle and supply the voltage on the power feeding line that has voltage thereon to the power supply unit.

Preferably, when the external power supply has failed, and if there is voltage on the power feeding line associated with the vehicle, the switch unit supplies power that is received from the vehicle to the power supply unit. When the communication unit receives the power from the power supply unit and is thus activated, the communication unit transmits to the vehicle a specification regarding power supplied from the external power supply to the load.

Preferably, the power feeding device further includes a switch that is connected between the power feeding line associated with the vehicle and the load and is driven to be closed after communication has been established between the vehicle and the power feeding device by the communication unit.

Advantageous Effects of Invention

The present invention thus ensures that a vehicle supplies power to a load external to the vehicle when external power supply has failed.

DESCRIPTION OF EMBODIMENTS

Hereinafter reference will be made to the drawings to describe the present invention in embodiments more specifically. In the figures, identical or corresponding components are identically denoted.

Figure 1:
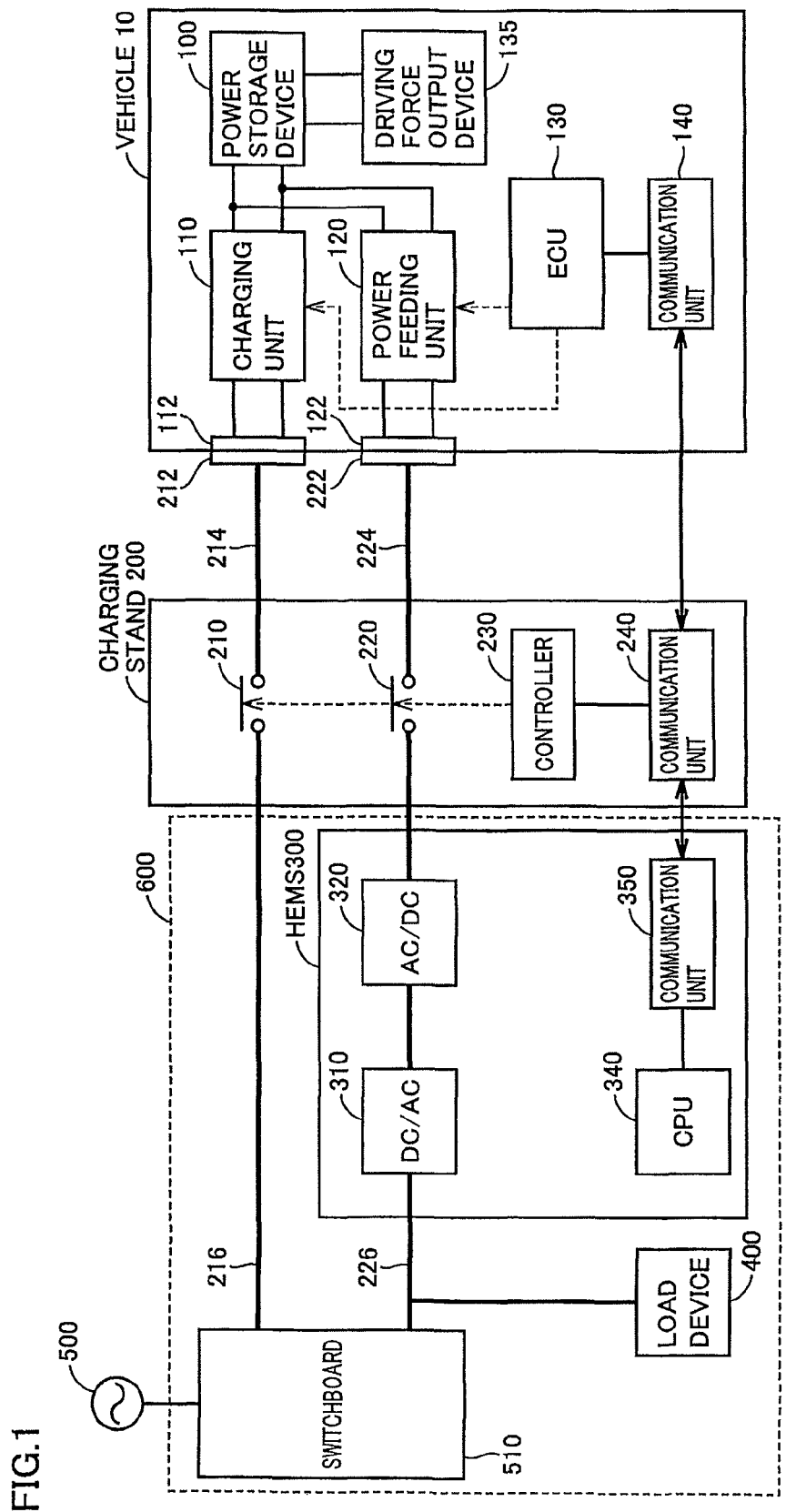
FIG. 1 schematically shows a configuration of a power supply system according to an embodiment of the present invention.

FIG. 1 schematically shows a configuration of a power supply system according to an embodiment of the present invention.

With reference to FIG. 1, the power supply system includes a vehicle 10, a charging stand 200, a home energy management system (HEMS) 300, a load device 400, a power supply 500 external to vehicle 10 (hereinafter also referred to as "external power supply"), and a switchboard 510.

The present invention in the embodiment provides vehicle 10 as a so called plug-in type electrically powered vehicle capable of electrically charging an in-vehicle power storage device via external power supply 500. Note that the electrically powered vehicle may not be limited in configuration in particular as long as it can travel on power received from the in-vehicle power storage device. Vehicle 10 includes a hybrid vehicle, an electric vehicle, a fuel cell powered vehicle and the like for example.

Figure 2:
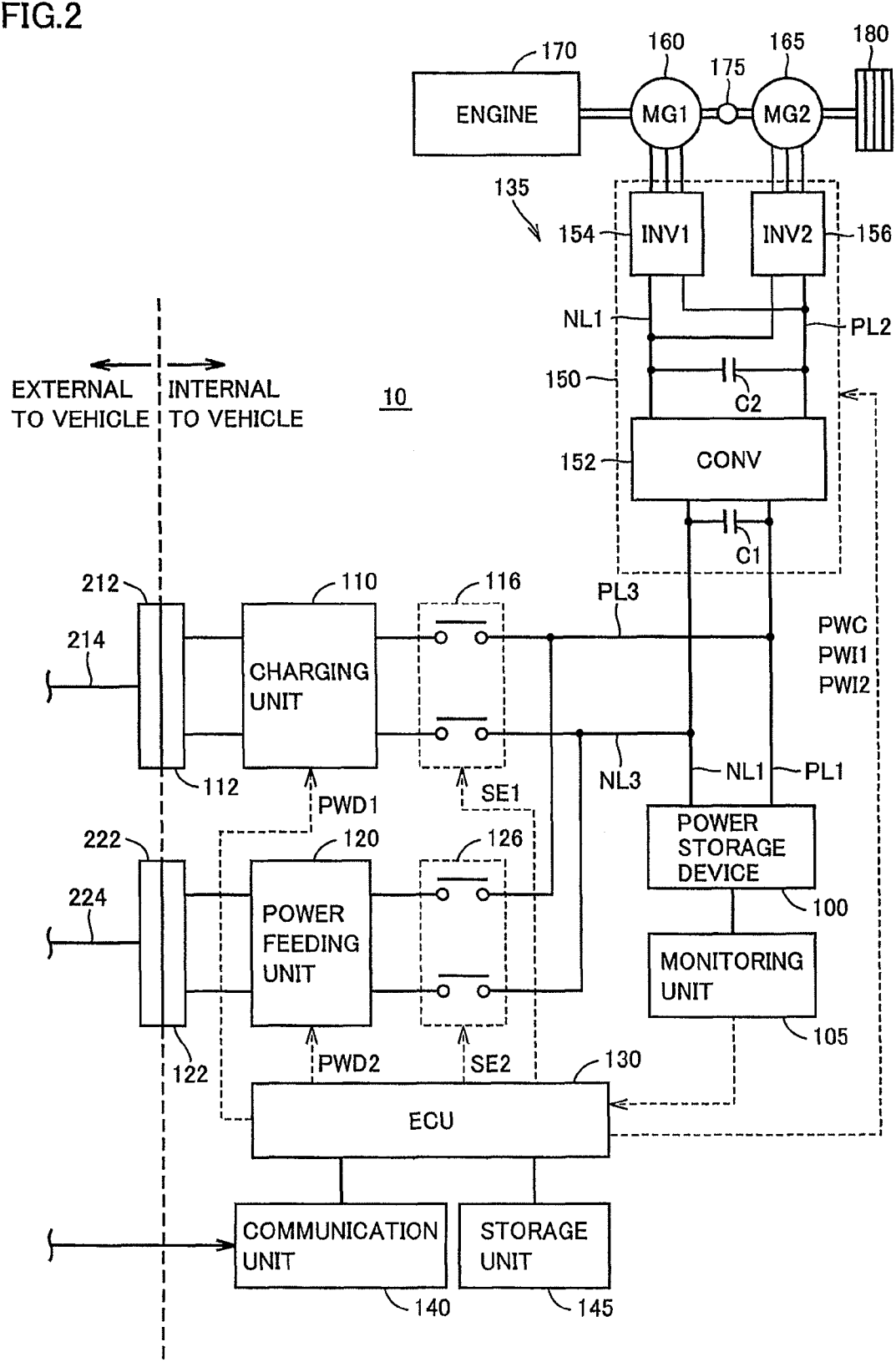
FIG. 2 illustrates a configuration of the vehicle in FIG. 1.

Vehicle 10 includes a power storage device 100, a driving force output device 135, an electronic control unit (ECU) 130 for generally controlling the operation of vehicle 10, a communication unit 140, and a storage unit 145 (see FIG. 2).

Power storage device 100 is a rechargeably configured power reservoir element, and representatively a lithium ion battery, a nickel metal hydride battery or a similar rechargeable battery. Alternatively, an electric double layer capacitor or a similar power reservoir element other than a battery may configure power storage device 100. FIG. 1 shows a configuration of a system of vehicle 10 that is relevant to controlling electrically charging and discharging power storage device 100. Power storage device 100 is provided with a battery sensor (not shown) for sensing the voltage and current of power storage device 100.

A monitoring unit 105 (see FIG. 2) detects a value indicative of a state of power storage device 100 based on an output of the battery sensor provided for power storage device 100. In other words, the value includes the voltage and/or current of power storage device 100. As described above, power storage device 100 is representatively a rechargeable battery, and accordingly, the voltage and current of power storage device 100 will hereinafter also be referred to as battery voltage and battery current, respectively. Furthermore, the battery voltage and the battery current will hereinafter also be referred to as "battery data" collectively.

Driving force output device 135 uses power stored in power storage device 100 to generate force to drive vehicle 10. Specifically, driving force output device 135 operates in response to a drive instruction received from ECU 130 to generate force for driving vehicle 10 and outputs the generated driving force to a driving wheel (not shown) of vehicle 10. Note that the drive instruction is a control instruction generated based on force requested to drive or brake the vehicle while vehicle 10 is travelling. Specifically, ECU 130 calculates force required for the entirety of vehicle 10 to drive or brake the vehicle in response to the state of vehicle 10 as a vehicle, the driver's operation such as how much the accelerator pedal is stepped on, the position of the shift lever, how much the brake pedal is stepped on, and the like. Then, ECU 130 generates an instruction to drive driving force output device 135 to implement force requested to drive or brake the vehicle.

Furthermore, when driving force output device 135 receives an instruction from ECU 130 to generate power, it generates power to be supplied to load device 400 external to the vehicle and outputs the generated power to a power feeding unit 120. Note that the instruction to generate power is a control instruction issued to generate power supplied to load device 400 in an emergency power generation mode described later.

With reference to FIG. 2, vehicle 10 (FIG. 1) will further be described in configuration.

With reference to FIG. 2, driving force output device 135 includes a power conversion unit (a power control unit: PCU) 150, motor generators 160, 165, a driving force transmission gear 175, an engine 170, and a driving wheel 180.

PCU 150 is connected to power storage device 100. Power storage device 100 supplies PCU 150 with power for generating force to drive vehicle 10. Furthermore, power storage device 100 stores power generated by motor generators 160, 165. Specifically, PCU 150 includes a converter 152, inverters 154, 156, and capacitors C1 and C2.

Converter 152 operates in response to a control signal PWC received from ECU 130 to perform voltage conversion between power lines PL1 and NL1 and power lines PL2 and NL1.

Inverters 154, 156 are connected to power lines PL2 and NL1 in parallel. Inverters 154, 156 operate in response to control signals PMI1 and PMI2 received from ECU 130 to convert direct current (dc) power that is received from converter 152 into alternating current (ac) power to drive motor generators 160, 165, respectively.

Capacitor C1 is provided between power lines PL1 and NL1, and decreases voltage variation caused between power lines PL1 and NL1.

Motor generator 160, 165 is an ac rotating electric machine, and for example is a permanent-magnet type, synchronous motor having a rotor with a permanent magnet embedded therein.

Motor generators 160, 165 output torque, which is in turn transmitted to driving wheel 180 via driving force transmission gear 175 configured of a speed reducer, a driving force split device and the like and thus causes vehicle 10 to travel. When vehicle 10 is braked regeneratively, motor generator 160, 165 can generate power by the torque of driving wheel 180. Then, the generated power is converted by PCU 150 into power charged to power storage device 100.

Furthermore, motor generators 160, 165 are also coupled with engine 170 via driving force transmission gear 175. Then, motor generators 160, 165 and engine 170 are cooperatively operated by ECU 130 to generate force required to drive the vehicle. Furthermore, motor generators 160, 165 can generate power by the rotation of engine 170, and the generated power can be used to electrically charge power storage device 100. Note that in the present embodiment, motor generator 165 is used exclusively as an electric motor for driving driving wheel 180 whereas motor generator 160 is used exclusively as a power generator driven by engine 170 for the sake of illustration.

Note that while FIG. 2 illustrates a configuration provided with two motor generators, the number of motor generators is not limited thereto, and a single motor generator or three or more motor generators may be provided.

Furthermore, while the present embodiment is described with vehicle 10 illustrated as a hybrid vehicle, as described above, vehicle 10 is not limited in configuration as long as it is a vehicle that can use power generated by the power generator driven by engine 170 and/or power output from power storage device 100 to supply power to a load device external to the vehicle. In other words, vehicle 10 includes a hybrid vehicle which generates force via an engine and an electric motor to drive the vehicle, as shown in FIG. 2, and in addition thereto, a vehicle provided with a power generator which does not generate force to drive the vehicle but generates power via an engine, an electric vehicle or a fuel cell powered vehicle which does not have an engine mounted therein, and the like.

Vehicle 10 further includes an inlet 112 provided in the body of vehicle 10, a charging unit 110, and a charging relay 116 as a configuration for electrically charging power storage device 100 with power received from external power supply 500. Note that external power supply 500 is representatively configured by a commercial power grid of single-phase ac. However, the commercial power grid may be replaced or cooperate with a solar battery panel provided on a roof of a residence or the like to generate power to supply power of external power supply.

To inlet 112 is connected a charging connector 212 of charging cable 214. Then from external power supply 500 power is transmitted via charging cable 214 to vehicle 10.

Charging unit 110 is a device receiving power from external power supply 500 for electrically charging power storage device 100. Charging unit 110 is provided between inlet 112 and power storage device 100. Charging unit 110 follows a control instruction PWD1 received from ECU 130 to convert ac power that is received from external power supply 500 via charging cable 214 and inlet 112 into dc power for electrically charging power storage device 100.

Between charging unit 110 and power storage device 100 is provided charging relay 116 connected such that it is inserted to power lines PL3 and NL3. Charging relay 116 is turned on and off in response to a relay control signal SE1 issued from ECU 130. Charging relay 116 is used as a representative example of a switch device which can interrupt a path used to electrically charge power storage device 100. That is, any form of switch device is applicable in place of charging relay 116.

When power storage device 100 is electrically charged via external power supply 500, ECU 130 generates control instruction PWD1 for controlling charging unit 110 and outputs the generated control instruction PWD1 to charging unit 110. At the time, ECU 130 operates in response to a pilot signal received from a charging circuit interrupting device (not shown) provided at an electric wire section of charging cable 214 for switching between supplying and interrupting power received from external power supply 500 to determine the type of external power supply 500 and control charging unit 110 in accordance with the type of external power supply 500 determined.

Furthermore, vehicle 10 further includes an inlet 122 provided in the body of vehicle 10, a power feeding unit 120, and a power feeding relay 126 as a configuration for supplying power to load device 400 (see FIG. 1) external to the vehicle.

To inlet 122 is connected a power feeding connector 222 of power feeding cable 224. Then, power discharged from power storage device 100 and/or that generated from driving force output device 135 (or motor generator 160) are/is transmitted to load device 400 via power feeding cable 224. In other words, power storage device 100 and/or driving force output device 135 (or motor generator 160) configure(s) a "power generation unit" provided for generating power supplied outside the vehicle.

Power feeding unit 120 is a device receiving power discharged from power storage device 100 and/or that generated from driving force output device 135 for feeding the received power to load device 400 external to the vehicle. Power feeding unit 120 operates in response to a control instruction PWD2 received from ECU 130 to receive via power lines PL3 and NL3 the power discharged from power storage device 100 and/or that generated from driving force output device 135, which are both dc power, and convert the received power to ac power for driving load device 400 external to the vehicle.

Between power feeding unit 120 and power storage device 100 is provided power feeding relay 126 connected such that it is inserted to power lines PL3 and NL3. Power feeding relay 126 is turned on and off in response to a relay control signal SE2 issued from ECU 130. Power feeding relay 126 is used as a representative example of a switch device which can interrupt an electrically discharging path provided from power storage device 100 and/or driving force output device 135. That is, any form of switch device is applicable in place of power feeding relay 126.

Although not shown in FIG. 1 or FIG. 2, ECU 130 includes a central processing unit (CPU), a storage device, and an input/output buffer, and receives a signal from each sensor and outputs a control signal to each device, and also controls vehicle 10 and each device. Note that such control may not be processed by software, and may be processed by dedicated hardware (or electronic circuitry).

ECU 130 receives the battery data (indicating the battery voltage and the battery current) from monitoring unit 105 and therefrom calculates the state of charge (SOC) of power storage device 100. An SOC indicates a currently available capacity relative to a full charge capacity in percentages (0-100%). How the SOC of power storage device 100 is calculated can be done in any known manner and accordingly, will not be described in detail.

ECU 130 generates and outputs a control instruction for controlling PCU 150, charging unit 110, charging relay 116, power feeding unit 120, and power feeding relay 126.

ECU 130 communicates via communication unit 140 via a wire or wirelessly with communication units 240 and 350 provided to charging stand 200 and HEMS 300, respectively, external to the vehicle. Then, ECU 130 receives information from communication units 240, 350 of charging stand 200 and HEMS 300 and stores the information to storage unit 145.

Note that vehicle 10, charging stand 200, and HEMS 300 can communicate via power line communication (PLC). In that case, communication units 140, 240, 350 are each configured of a PLC unit, and transmit information via a power line.

The present invention in the embodiment thus provides vehicle 10 configured to be capable of electrically charging in-vehicle power storage device 100 by external power supply 500 and also supplying power therefrom to load device 400 external thereto. In the following description, electrically charging power storage device 100 by external power supply 500 will also be referred to as "external charging", and supplying outside the vehicle the power discharged from power storage device 100 and/or the power generated by driving force output device 135 (or motor generator 160) will also be referred to as "external power feeding".

Note that in the present embodiment the external charging is not essential, and a vehicle traveling only on force provided from the engine to drive the vehicle may not be provided with a configuration allowing the external charging.

Furthermore, the FIGS. 1 and 2 configuration may be replaced with a configuration which allows an external power supply and a vehicle that are out of physical contact to be electromagnetically coupled together to supply power, specifically, the external power supply may be provided with a primary coil and the vehicle may be provided with a secondary coil, and the mutual inductance between the primary coil and the secondary coil may be utilized to supply power.

With reference again to FIG. 1, charging stand 200 includes charging cable 214, charging connector 212, and a relay 210 for the external charging. Furthermore, charging stand 200 includes power feeding cable 224, power feeding connector 222, and a relay 220 for the external power feeding. Charging stand 200 further includes a controller 230 and communication unit 240. Charging stand 200 is electrically connected via power feeding lines 216, 226 to switchboard 510 provided in a building such as premises 600.

Charging cable 214 has one end connected to relay 210 and the other end connected to charging connector 212. Power feeding cable 224 has one end connected to relay 220 and the other end connected to power feeding connector 222. Charging cable 214 and power feeding cable 224 may be separatable from charging stand 200. Alternatively, a charging cable and a power feeding cable that are provided to vehicle 10 may be used to connect charging stand 200 and vehicle 10 together.

Furthermore, while FIG. 1 shows charging cable and connector 214 and 212 and power feeding cable and connector 224 and 222 provided discretely, alternatively a single cable and a single connector may be switched between charging and power feeding and thus used. In that case, vehicle 10 also has inlets 112 and 122 provided as a single inlet switchable between charging and power feeding.

For the external charging, charging connector 212 is connected to vehicle 10 at inlet 112 and relay 210 is closed, and vehicle 10 thus receives power from external power supply 500 through premises 600 via switchboard 510 and power feeding line 216. In contrast, for the external power feeding, power feeding connector 222 is connected to vehicle 10 at inlet 122 and relay 220 is closed, and vehicle 10 thus supplies premises 600 with power via power feeding line 226. Relays 210, 220 are opened/closed as controlled by controller 230.

Controller 230 is configured for example of a CPU and the like. Controller 230 is configured to be capable of communicating with the vehicle 10 ECU 130 via communication units 240, 140 wirelessly or via a wire. Controller 230 is configured to be capable of communicating with the HEMS 300 CPU 340 via communication units 240, 350 wirelessly or via a wire.

Controller 230 transmits a signal indicative of a state of relays 210 and 220 (i.e., whether the relays are opened/closed) to the HEMS 300 CPU 340 and the vehicle 10 ECU 130. In other words, controller 230 transmits to CPU 340 and ECU 130 a signal indicating which of the external charging and the external power feeding has been selected.

HEMS 300 is provided internal or external to premises 600. HEMS 300 is electrically connected to switchboard 510 and charging stand 200 via power feeding line 226. HEMS 300 includes a DC/AC converter 310, an AC/DC converter 320, CPU 340, and communication unit 350.

AC/DC converter 320 receives ac power from charging stand 200 and converts it into dc power. DC/AC converter 310 receives the dc power from AC/DC converter 320 and converts it into ac power. AC/DC converter 320 and DC/AC converter 310 are controlled in accordance with a control signal which CPU 340 generates based on a signal transmitted from the charging stand 200 communication unit 240 and indicating which of the external charging and the external power feeding has been selected.

Load device 400 is any electrical appliance receiving power from external power supply 500 via switchboard 510 for operation. Load device 400 may be premises 600 or may be individual electric appliances, for example. Alternatively, load device 400 may be a vehicle other than vehicle 10.

Herein, in the FIG. 1 power supply system, if external power supply 500 has failed, the power supplied to load device 400 is interrupted. Thus, once external power supply 500 has failed, then, in place of external power supply 500, vehicle 10 is regarded as a power supply source, and from vehicle 10 power is supplied to load device 400. In the following description, a mode allowing vehicle 10 to be used as a backup power supply for external power supply 500 to perform the external power feeding will be referred to as an "emergency power generation mode". In contrast, a mode allowing the external power feeding and the external charging when external power supply 500 normally operates will be referred to as a "normal mode".

In the emergency power generation mode, the power feeder or vehicle 10 is required to generate ac power of a specification that matches that of the power recipient or load device 400. The specification of load device 400 (hereinafter also referred to as a "load specification") is a specification regarding power supplied to load device 400 and it includes the frequency and voltage of external power supply 500. As an example, if external power supply 500 is a commercial power grid, the commercial power grid normally has a frequency of 50 kHz or 60 kHz. Furthermore, the commercial power grid generates a commercial ac voltage of 100 V or 200 V.

In the normal mode, the vehicle 10 ECU 130 can communicate with HEMS 300 and charging stand 200 via communication units 140, 240, 350 to obtain the load specification. Then, vehicle 10 can generate appropriate ac power corresponding to the obtained load specification and supply load device 400 therewith.

In contrast, once external power supply 500 has failed, the above described communication function will not normally operate, and the vehicle 10 ECU 130 can no longer obtain the load specification. Thus, vehicle 10 cannot generate ac power of an appropriate frequency and voltage corresponding to load device 400 and supply load device 400 therewith. Hereinafter, what problem will arise once external power supply 500 has failed will be described with reference to FIG. 3.

Figure 3:
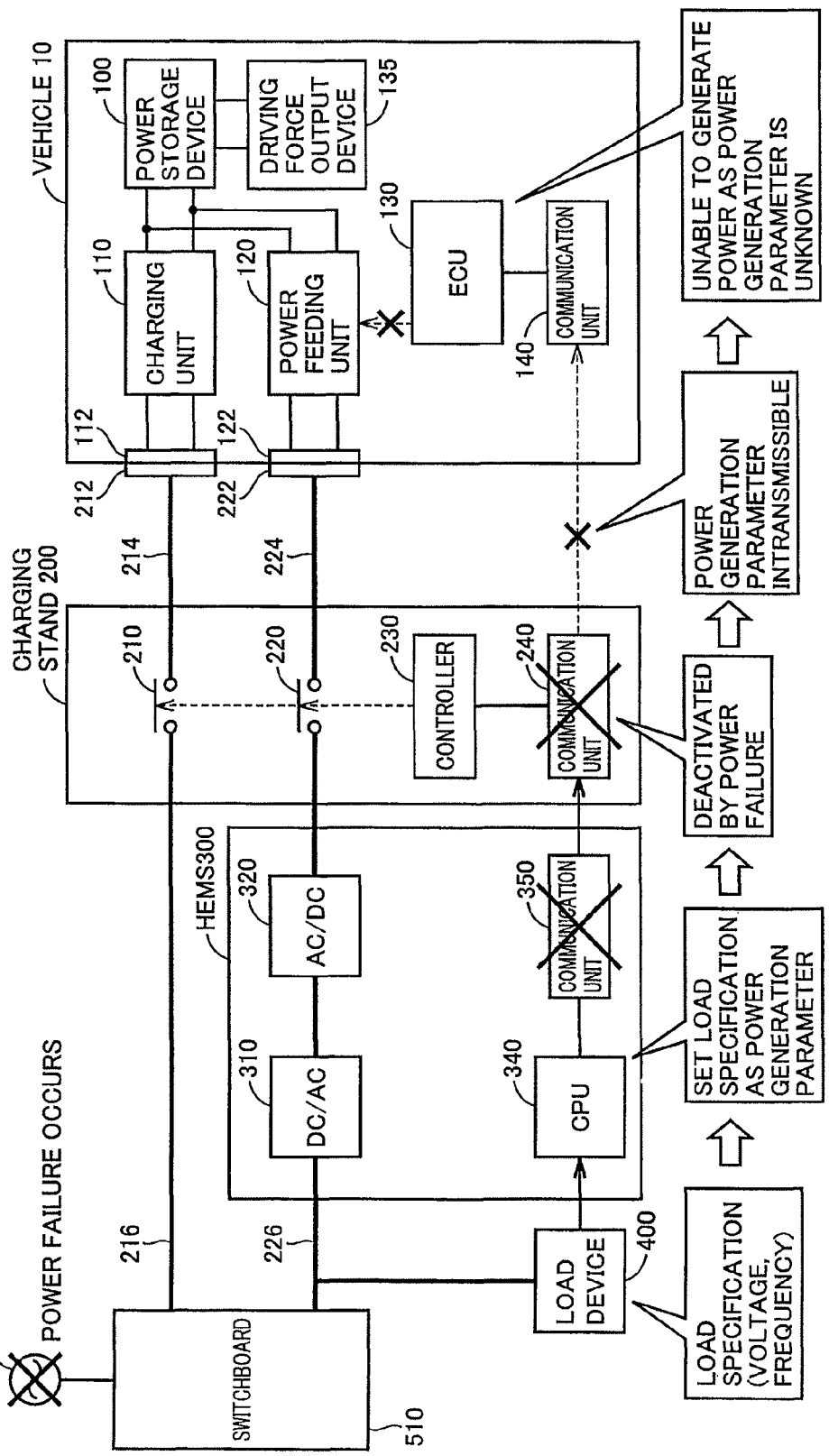
FIG. 3 shows the power supply system when an external power supply has failed.

FIG. 3 shows the power supply system when external power supply 500 has failed.

With reference to FIG. 3, HEMS 300 sets a load specification, or external power supply 500's frequency and voltage, as a power generation parameter. The power generation parameter is transmitted to the vehicle 10 ECU 130 via communication units 350, 240, 140, and used by ECU 130 for a power feeding operation in vehicle 10. Specifically, ECU 130 converts the power that is discharged from power storage device 100 into the ac power defined by the power generation parameter, and supplies the ac power outside the vehicle. Furthermore, ECU 130 converts the dc power that is generated by driving force output device 135 into the ac power defined by the power generation parameter, and supplies the ac power outside the vehicle.

However, once external power supply 500 has failed, then, as shown in FIG. 3, the power supplied to HEMS 300 and charging stand 200 is interrupted, and the HEMS 300 communication unit 350 and the charging stand 200 communication unit 240 are deactivated. Thus the power generation parameter cannot be transmitted from HEMS 300 or charging stand 200 to vehicle 10.

In vehicle 10, on the other hand, once that external power supply 500 has failed has been detected, ECU 130 turns off the normal mode and turns on the emergency power generation mode. Once the emergency power generation mode has been turned on, ECU 130 controls power feeding unit 120 for a power conversion operation to convert the dc power that is output from power storage device 100 and/or driving force output device 135 into ac power suitable for driving load device 400 external to the vehicle. However, as described above, ECU 130 cannot obtain the power generation parameter for defining the ac power's frequency and voltage, and hence cannot control power feeding unit 120.

In order to address this issue, the power supply system in the present embodiment operates as follows: once external power supply 500 has failed and accordingly, the emergency power generation mode has been turned on, vehicle 10 first supplies the HEMS 300 communication unit 350 and the charging stand 200 communication unit 240 with power to activate communication units 350, 240. Then vehicle 10 communicates with HEMS 300 and charging stand 200 via communication units 140, 240, 350 to obtain the load specification. Vehicle 10 can thus generate appropriate ac power corresponding to the obtained load specification and supply load device 400 therewith.

Figure 4:
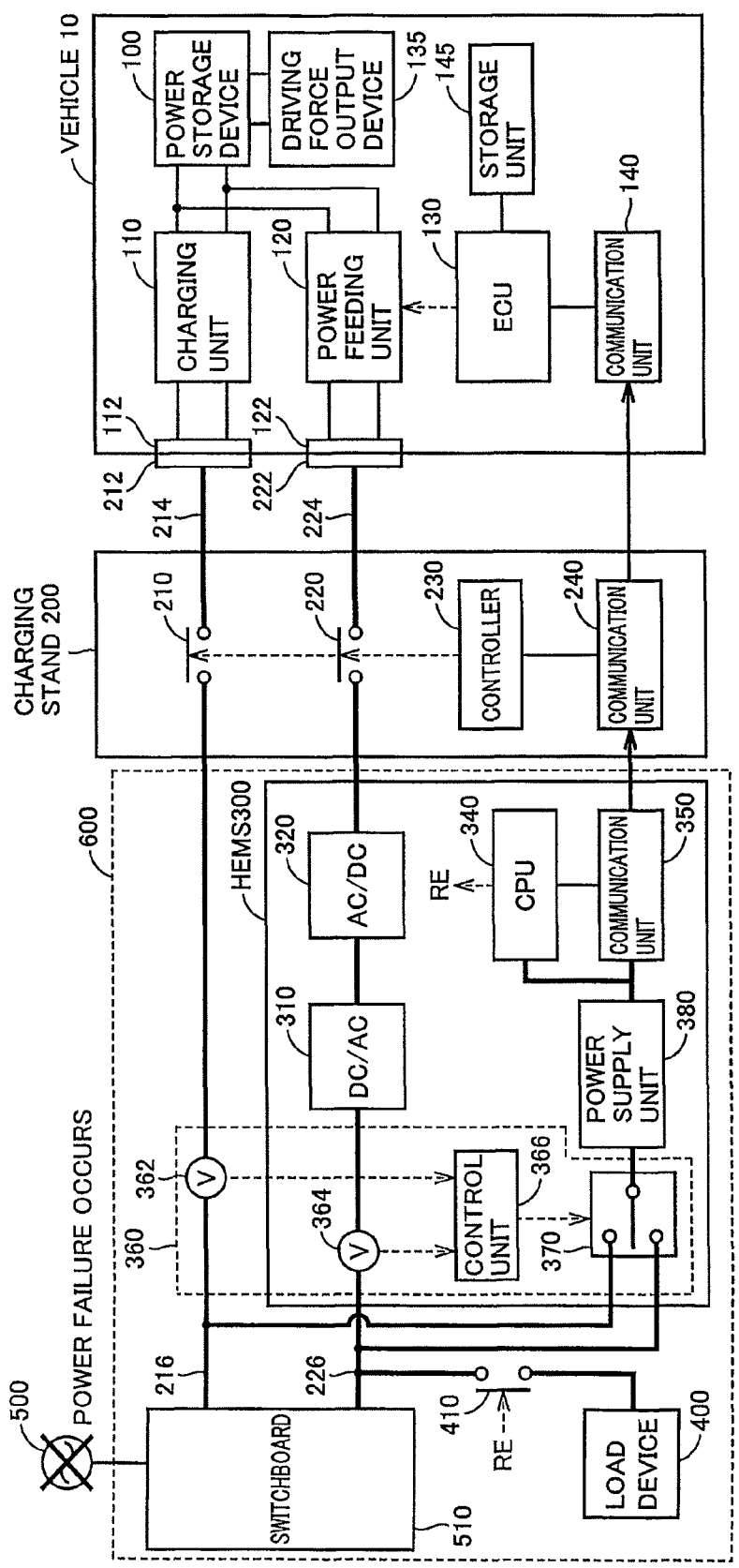
FIG. 4 illustrates how the power supply system in the embodiment of the present invention operates in a normal mode.

FIG. 4 illustrates how the power supply system in the embodiment of the present invention operates in the emergency power generation mode.

With reference to FIG. 4, the power supply system in the present embodiment differs from that shown in FIG. 3 in that HEMS 300 further includes a switch unit 360, a power supply unit 380, and a switch 410.

Switch unit 360 is provided between power feeding lines 216, 226 and power supply unit 380. Switch unit 360 can switch a power supply source for power supply unit 380 between external power supply 500 and vehicle 10. Specifically, switch unit 360 includes voltage sensors 362, 364, a control unit 366, and a contact unit 370.

Voltage sensor 362 is provided on power feeding line 216 provided between charging cable 214 and switchboard 510 and associated with external power supply 500. Voltage sensor 362 senses voltage on power feeding line 216 and outputs the sensed value to control unit 366.

Voltage sensor 364 is provided on power feeding line 226 provided between power feeding cable 224 and switchboard 510 and associated with vehicle 10. Voltage sensor 364 senses voltage on power feeding line 226 and outputs the sensed value to control unit 366.

Contact unit 370 is provided between power feeding lines 216, 226 and power supply unit 380. Contact unit 370 is controlled by control unit 366 to switch a state with power feeding line 216 connected to power supply unit 380 and a state with power feeding line 226 connected to power supply unit 380.

Control unit 366 operates in response to a value sensed by voltage sensors 362, 364 to control how contact unit 370 should be connected. Specifically, if there is voltage on power feeding line 216 and there is no voltage on power feeding line 226, control unit 366 controls contact unit 370 to connect power feeding line 216 that has voltage thereon to power supply unit 380. On the other hand, if there is no voltage on power feeding line 216 and there is voltage on power feeding line 226, control unit 366 controls contact unit 370 to connect power feeding line 226 that has voltage thereon to power supply unit 380. By this configuration the voltage of the power feeding line that has voltage thereon is supplied to power supply unit 380 and thus activates power supply unit 380.

Note that power supply unit 380 is configured to be capable of receiving power of a variety of specifications (for frequency and voltage). Power supply unit 380 can convert the received power into power suitable for driving an electrical appliance configuring HEMS 300 and charging stand 200 and supply the electrical appliance therewith.

When power supply unit 380 supplies power and CPU 340 and communication units 350, 240 are thereby activated, HEMS 300 and charging stand 200 establish a state allowing them to be able to communicate with vehicle 10.

Switch 410 is connected between power feeding line 226 and load device 400. Switch 410 is controlled by a control signal RE issued from CPU 340 to switch supplying and interrupting power between power feeding line 226 and load device 400. CPU 340 closes switch 410 when communication is established between HEMS 300, charging stand 200 and vehicle 10, as will be described hereinafter.

In the FIG. 4 power supply system, when external power supply 500 normally operates, there is voltage on power feeding line 216, and accordingly, power supply unit 380 receives power from external power supply 500 via the switch unit 360 contact unit 370 and activates CPU 340 and communication units 350, 240. In contrast, once external power supply 500 has failed, the power supplied from external power supply 500 is interrupted and CPU 340 and communication units 350, 240 are deactivated. As a result, vehicle 10 can no longer communicate with HEMS 300 and charging stand 200 and hence obtain the power generation parameter.

Accordingly in the present embodiment once external power supply 500 has failed and accordingly, the emergency power generation mode has been turned on, the vehicle 10 ECU 130 first operates to supply power from vehicle 10 to HEMS 300's internal power supply unit 380 to activate communication units 350, 240. More specifically, ECU 130 converts the power that is discharged from power storage device 100 and/or the power that is generated from driving force output device 135 into ac power for activating power supply unit 380 internal to HEMS 300. In doing so, ECU 130 follows a prescribed specification to control power feeding unit 120 for the power conversion operation. This prescribed specification is previously determined and stored in storage unit 145.

Thus ac power defined in the prescribed specification is supplied from vehicle 10 to HEMS 300. HEMS 300 receives power from vehicle 10, and once HEMS 300 has received voltage on power feeding line 226, switch unit 360 connects power feeding line 226 to power supply unit 380. Power supply unit 380 thus receives power from vehicle 10 via power feeding line 226 and is thus activated. Then, power supply unit 380 activates CPU 340 and communication units 350, 240.

Once HEMS 300 and charging stand 200 have established a state allowing them to be able to communicate with vehicle 10 the HEMS 300 CPU 340 sets the load specification, or external power supply 500's frequency and voltage, as a power generation parameter. Then, CPU 340 transmits the power generation parameter to vehicle 10 via communication unit 350 and the charging stand 200 communication unit 240.

Vehicle 10 receives the power generation parameter via communication unit 140, and ECU 130 rewrites the prescribed specification that is stored in storage unit 145 to the received power generation parameter (or load specification). Then, ECU 130 follows the obtained load specification to control power feeding unit 120 for the power conversion operation. This allows vehicle 10 to output appropriate ac power corresponding to a specification of load device 400 and supply it via charging stand 200 to HEMS 300.

As HEMS 300 has now established communication with vehicle 10, CPU 340 closes switch 410. Load device 400 can thus receive the power supplied from vehicle 10 and received by HEMS 300.

Figure 5:
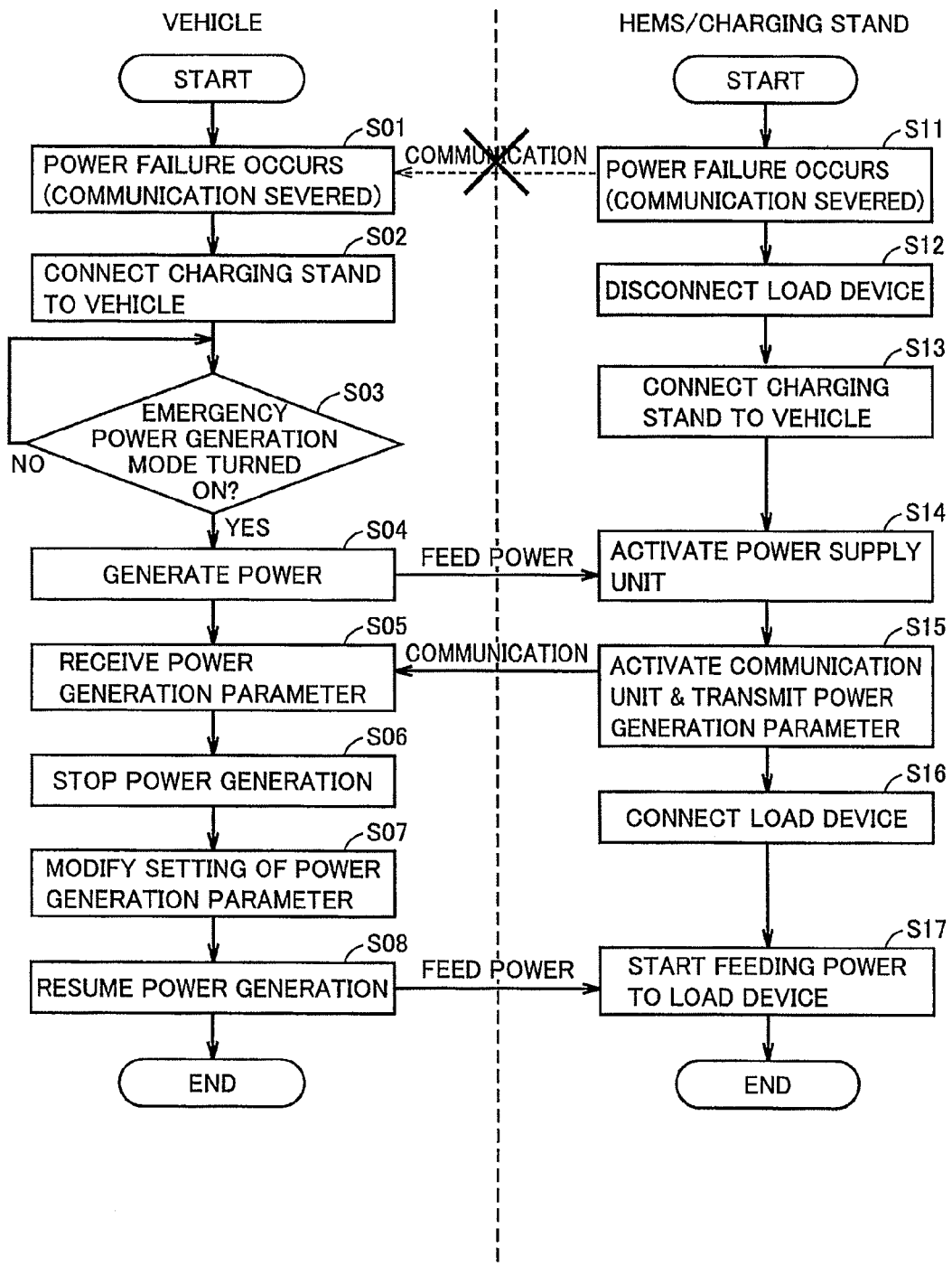
FIG. 5 is a flowchart for illustrating how the vehicle, a charging stand and a HEMS operate in the power supply system in the embodiment of the present invention.

FIG. 5 is a flowchart for illustrating how the vehicle and the charging stand operate in the power supply system in the embodiment of the present invention.

With reference to FIG. 5, in steps S01 and S11, external power supply 500 fails, and the HEMS 300 communication unit 350 and the charging stand 200 communication unit 240 are deactivated. This severs communication between HEMS 300 and charging stand 200, and vehicle 10.

HEMS 300 is now incapable of communicating with vehicle 10, and accordingly, CPU 340 proceeds to step S12 to open switch 410. This stops power supplied to load device 400.

In steps S02 and S13 power feeding connector 222 is connected to inlet 122 to connect charging stand 200 to vehicle 10, and in vehicle 10 ECU 130 proceeds to step S03 to determine whether the emergency power generation mode has been turned on. If not (NO in step S03), the control returns to step S03. If the emergency power generation mode has been turned on (YES in step S03), ECU 130 proceeds to step S04 to read a predetermined specification stored in storage unit 145. ECU 130 in step S04 then follows the read, prescribed specification to control power feeding unit 120 for the power conversion operation to generate ac power to be supplied from vehicle 10 to HEMS 300.

The ac power generated by vehicle 10 is supplied to HEMS 300 via charging stand 200. In step S14, the HEMS 300 power supply unit 380 receives the power supplied from vehicle 10 via switch unit 360 and is thus driven.

As power supply unit 380 has been activated in step S14, in step S15 the HEMS 300 communication unit 350 and the charging stand 200 communication unit 240 are activated. In step S16, CPU 340 sets the specification of load device 400 as a power generation parameter. Then, CPU 340 transmits the set power generation parameter (or the specification of load device 400) to vehicle 10 via communication units 350, 240. Furthermore, as HEMS 300 and charging stand 200, have now established communication with vehicle 10, CPU 340 proceeds to step S16 to close switch 410.

In vehicle 10, step S05 is performed to receive the power generation parameter via communication unit 140, and in response, ECU 130 proceeds to step S06 to stop power storage device 100 from discharging power and/or driving force output device 135 from generating power and thus stop power supplied outside the vehicle.

In step S07, ECU 130 rewrites the prescribed specification that is previously stored in storage unit 145 to the received load specification to modify a setting of the power generation parameter. ECU 130 then proceeds to step S08 to follow the modified power generation parameter to control power feeding unit 120 for the power conversion operation to generate ac power to be supplied from vehicle 10 to load device 400. This resumes supplying power outside the vehicle.

The ac power generated by vehicle 10 is supplied to load device 400 via charging stand 200 and HEMS 300. Load device 400 receives the power supplied from vehicle 10 and is thus driven thereby.

In the present embodiment, power storage device 100 and driving force output device 135 (or motor generator 160) correspond to a "power generation unit", power feeding unit 120 corresponds to a "power feeding unit", and ECU 130 corresponds to a "control device". Furthermore, HEMS 300 and charging stand 200 correspond to a "power feeding device". Communication unit 240, 350 corresponds to a "communication unit", switch unit 360 corresponds to a "switch unit", and switch 410 corresponds to a "switch".

Thus the present invention in an embodiment can provide such a power supply system that once an external power supply has failed a vehicle supplies power to activate an HEMS's communication unit and a charging stand's communication unit to establish a state allowing the vehicle and the HEMS and charging stand to communicate with each other. This allows a specification regarding power supplied to a load device (or a load specification) to be transmitted to the vehicle so that the vehicle can supply appropriate power that corresponds to the load specification. This ensures that when the external power supply has failed, backup power is generated to drive the load device stably.

Note that the load specification used in the external power feeding is obtained by performing communication between the charging stand and HEMS connected to the vehicle and the vehicle when the external power supply has failed, and accordingly, the load specification is updated whenever the external power supply fails. Accordingly, the load specification that the vehicle has obtained and that of the power recipient or load device always match, thus allowing the load device to receive power.

Furthermore, while FIG. 1 and FIG. 2 show charging unit 110 and power feeding unit 120 as discrete devices, a single power conversion unit may alternatively be provided to be capable of bidirectional power conversion for electrically charging power and feeding power.

Furthermore, while FIG. 1 shows charging stand 200 and HEMS 300 each provided with a communication unit by way of example, alternatively, any one of charging stand 200 and HEMS 300 may be provided with a communication unit for communicating with vehicle 10.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present invention is applicable to power supply systems which supply power from a vehicle to a load external to the vehicle.

REFERENCE SIGNS LIST

10: vehicle; 100: power storage device; 105: monitoring unit; 110: charging unit; 112, 122: inlet; 116: charging relay; 120: power feeding unit; 126: power feeding relay; 135: driving force output device; 140, 240, 350: communication unit; 145: storage unit; 152: converter; 154, 156: inverter; 160, 165: motor generator; 170: engine; 175: driving force transmission gear; 180: driving wheel; 200: charging stand; 210, 220: relay; 212: charging connector; 214: charging cable; 216, 226: power feeding line; 222: power feeding connector; 224: power feeding cable; 230: controller; 300: HEMS; 310: AC/DC converter; 320: DC/AC converter; 340: CPU; 360: switch unit; 362, 364: voltage sensor; 366: control unit; 370: contact unit; 380: power supply unit; 400: load device; 410: switch; 500: external power supply; 510: switchboard; 600: premises.

The invention claimed is:

1. A power supply system comprising:
a vehicle; and
a power feeding device for receiving power from said vehicle and feeding the received power to a load external to said vehicle,
said load being configured to receive power supplied from an external power supply and be driven thereby and to also receive power from said vehicle and be driven thereby once said external power supply has failed,
said power feeding device including
a communication unit for communication between said vehicle and said power feeding device, and
a power supply unit that supplies said communication unit with power,
said vehicle including
a power generation unit,
a power feeding unit for receiving power from said power generation unit and supplying the received power to said power feeding device, and
a control device that controls said power feeding unit to convert the power received from said power generation unit into power to drive said load when said external power supply has failed,
when said external power supply has failed, said power feeding device supplying the power that is received from said vehicle to said power supply unit to activate said communication unit, and said power feeding device also transmitting via said communication unit to said control device a specification regarding power supplied from said external power supply to said load,
while said control device follows a predetermined specification to control said power feeding unit, once said specification regarding power supplied from said external power supply to said load has been received, said control device following said specification regarding power supplied from said external power supply to said load, rather than said predetermined specification, to control said power feeding unit.

2. The power supply system according to claim 1, wherein said power feeding device further includes a switch unit configured to compare voltage on a power feeding line associated with said external power supply and voltage on a power feeding line associated with said vehicle and supply the voltage on said power feeding line that has voltage thereon to said power supply unit.

3. The power supply system according to claim 2, wherein:
said load is connected via a switch to said power feeding line associated with said vehicle; and
said power feeding device closes said switch after communication has been established between said vehicle and said power feeding device by said communication unit.

4. The power supply system according to claim 1, wherein:
said power generation unit includes a rechargeable power storage device;
said vehicle is configured to be capable of electrically charging said power storage device with power received from said external power supply; and
said control device follows said specification regarding power supplied from said external power supply to said load, to control said power feeding unit to convert power that is discharged from said power storage device into power to drive said load.

5. The power supply system according to claim 1, wherein:
said vehicle further includes an internal combustion engine as a source of force to drive said vehicle;
said power generation unit includes
a rechargeable power storage device, and
a power generator configured to use an output of said internal combustion engine to generate power;
said vehicle is configured to be capable of electrically charging said power storage device with power received from said external power supply; and
said control device follows said specification regarding power supplied from said external power supply to said load, to control said power feeding unit to convert at least one of power discharged from said power storage device and power generated by said power generator into power to drive said load.

6. A power feeding device for receiving power from a vehicle and feeding the received power to a load external to said vehicle, comprising:
a communication unit for communication between said vehicle and the power feeding device;

a power supply unit that supplies said communication unit with power; and a switch unit configured to compare voltage on a power feeding line associated with an external power supply and voltage on a power feeding line associated with said vehicle and supply the voltage on said power feeding line that has voltage thereon to said power supply unit, wherein:

when said external power supply has failed, and if there is voltage on said power feeding line associated with said vehicle, said switch unit supplies power that is received from said vehicle to said power supply unit; and when said communication unit receives the power from said power supply unit and is thus activated, said communication unit transmits to said vehicle a specification regarding power supplied from said external power supply to said load.

7. The power feeding device according to claim 6, further comprising a switch that is connected between said power feeding line associated with said vehicle and said load and is driven to be closed after communication has been established between said vehicle and the power feeding device by said communication unit.

8. The power supply system according to claim 2, wherein:
said power generation unit includes a rechargeable power storage device;
said vehicle is configured to be capable of electrically charging said power storage device with power received from said external power supply; and
said control device follows said specification regarding power supplied from said external power supply to said load, to control said power feeding unit to convert power that is discharged from said power storage device into power to drive said load.

9. The power supply system according to claim 3, wherein:
said power generation unit includes a rechargeable power storage device;
said vehicle is configured to be capable of electrically charging said power storage device with power received from said external power supply; and
said control device follows said specification regarding power supplied from said external power supply to said load, to control said power feeding unit to convert power that is discharged from said power storage device into power to drive said load.

10. The power supply system according to claim 2, wherein:
said vehicle further includes an internal combustion engine as a source of force to drive said vehicle;
said power generation unit includes
a rechargeable power storage device, and
a power generator configured to use an output of said internal combustion engine to generate power;
said vehicle is configured to be capable of electrically charging said power storage device with power received from said external power supply; and
said control device follows said specification regarding power supplied from said external power supply to said load, to control said power feeding unit to convert at least one of power discharged from said power storage device and power generated by said power generator into power to drive said load.

11. The power supply system according to claim 3, wherein:
said vehicle further includes an internal combustion engine as a source of force to drive said vehicle;
said power generation unit includes
a rechargeable power storage device, and
a power generator configured to use an output of said internal combustion engine to generate power;
said vehicle is configured to be capable of electrically charging said power storage device with power received from said external power supply; and
said control device follows said specification regarding power supplied from said external power supply to said load, to control said power feeding unit to convert at least one of power discharged from said power storage device and power generated by said power generator into power to drive said load.

* * * * *